US009483228B2

(12) United States Patent
Saungsomboon et al.

(10) Patent No.: US 9,483,228 B2
(45) Date of Patent: Nov. 1, 2016

(54) LIVE ENGINE

(71) Applicant: Dolby Laboratories Licensing Corporation, San Francisco, CA (US)

(72) Inventors: Prinyar Saungsomboon, Reading (GB); S. Spencer Hooks, San Mateo, CA (US); Joshua Brandon Lando, San Francisco, CA (US); Stewart Murrie, San Francisco, CA (US); Eric Whelan Yeargan, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 26 days.

(21) Appl. No.: 14/305,575

(22) Filed: Jun. 16, 2014

(65) Prior Publication Data

US 2015/0057779 A1 Feb. 26, 2015

Related U.S. Application Data

(60) Provisional application No. 61/869,765, filed on Aug. 26, 2013.

(51) Int. Cl.
| | | |
|---|---|---|
| *G06F 17/00* | (2006.01) | |
| *G06F 3/16* | (2006.01) | |
| *H04S 7/00* | (2006.01) | |
| *G11B 27/031* | (2006.01) | |
| *H04H 60/02* | (2008.01) | |

(52) U.S. Cl.
CPC ............. *G06F 3/16* (2013.01); *G06F 3/165* (2013.01); *G11B 27/031* (2013.01); *H04H 60/02* (2013.01); *H04S 7/30* (2013.01)

(58) Field of Classification Search
CPC .. H04S 2400/11; H04S 2400/15; H04S 7/30; G10L 2021/02166; G10L 21/028; H04N 13/0014; H04N 5/232; H04N 5/23238; H04R 2420/01; G06F 3/16; G06F 3/165
See application file for complete search history.

(56) References Cited

U.S. PATENT DOCUMENTS

| | | |
|---|---|---|
| 5,714,997 A | 2/1998 | Anderson |
| 2003/0053634 A1 | 3/2003 | McGrath |
| 2005/0080616 A1 | 4/2005 | Leung |
| 2007/0279494 A1* | 12/2007 | Aman ................... G01S 3/7864 348/169 |
| 2011/0164769 A1 | 7/2011 | Zhan |
| 2012/0307048 A1 | 12/2012 | Abrahamsson |

FOREIGN PATENT DOCUMENTS

| | | |
|---|---|---|
| EP | 2451196 | 5/2012 |
| WO | 2006/001675 | 2/2006 |
| WO | 2013/006330 | 1/2013 |
| WO | 2013/006338 | 1/2013 |

* cited by examiner

*Primary Examiner* — Andrew C Flanders

(57) ABSTRACT

Non-media data relating to real-world objects or persons are collected from a scene while media data from the same scene are collected. The media data comprise audio data only or audiovisual data, whereas the non-media data comprise telemetry data and/or non-telemetry data. Based at least in part on the non-media data relating to the real-world objects or persons in the scene, emitter-listener relationships between a listener and some or all of the real-world objects or persons are determined. Audio objects comprising audio content portions and non-audio data portions are generated. At least one audio object is generated based at least in part on the emitter-listener relationships.

19 Claims, 9 Drawing Sheets

＃ LIVE ENGINE

CROSS REFERENCE TO RELATED APPLICATIONS

This application claims benefit of priority to related, U.S. Provisional Patent Application No. 61/869,765 filed on Aug. 26, 2013 entitled, "Live Engine" which is incorporated herein by reference in its entirely.

TECHNOLOGY

The present invention relates to dynamically generating audio content, and in particular to dynamically generating audio content based on real-world telemetry information.

BACKGROUND

Audio production tools typically require a large amount of manual input and intervention from mixing engineers. In order to create a complex audio soundscape in an audio or audiovisual product, a mixing engineer has to painstakingly perform a large number of detailed manipulations, often through many iterations. It is difficult and nearly impossible to apply these audio production tools with the associated time-consuming manual operations to live events in which sound emitters, along with their locations and characteristics, may not be known ahead of time.

Even if manual operations performed in non-live offline audio production studios could be transplanted in audio production for live events, a significant number of errors, inaccuracies, inconsistencies, etc., in timing, sound emitter positioning, sound effects, etc., would be inevitably introduced.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1A:
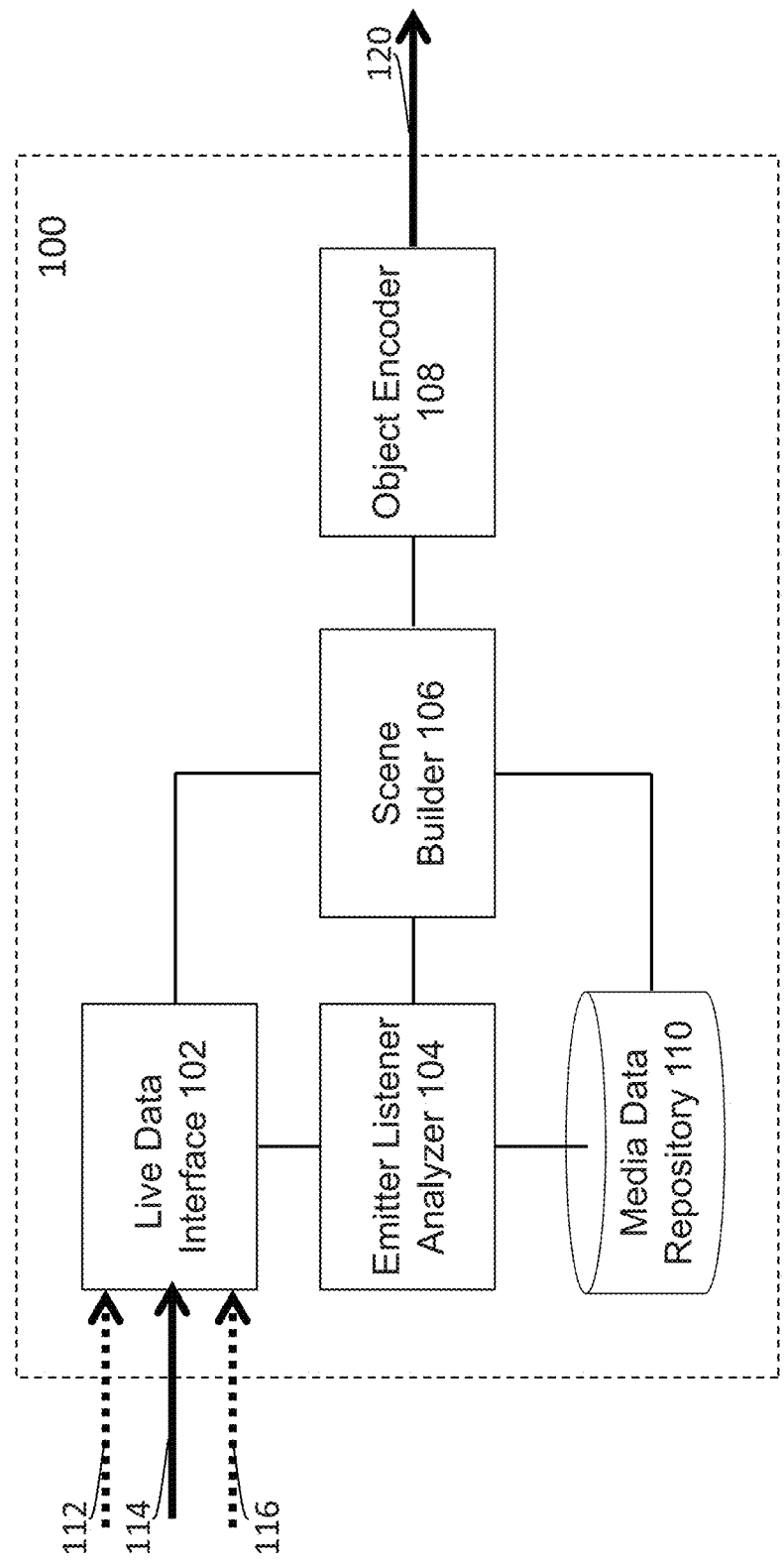
FIG. 1A and FIG. 1B illustrate an example media encoding system and an example media decoding system, respectively.

Example embodiments, which relate to dynamically generating audio content based on real-world telemetry information, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. MEDIA ENCODING SYSTEMS
3. MEDIA DECODING SYSTEMS
4. REAL TIME CREATION OF A SURROUND SOUND SCENE
5. EXAMPLE PROCESS FLOWS
6. IMPLEMENTATION MECHANISMS—HARDWARE OVERVIEW
7. EQUIVALENTS, EXTENSIONS, ALTERNATIVES AND MISCELLANEOUS

1. General Overview

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

Techniques as described herein enable a media processing system (e.g., a live broadcast system, a movie production system, etc.) to automatically create in real time or near real time complex audio soundscapes (e.g. surround soundscapes, etc.) relating to live events, movie shoots, etc., as the actions of the live events, movie shoots, etc., are unfolding.

In some embodiments, instead of generating channel-coded audio data, a media encoding system at a live event, a movie shoot, etc., generates audio objects that comprise both audio content (e.g., PCM data, audio sample data, etc.) and non-audio data (e.g., positional data of sound emitters, operational data for pre- or post-processing, etc.) related to the audio content.

In some embodiments, a live event, a movie shoot, etc., may have the presence of many objects or people such as cars, airplanes, actors, audience, spectators, birds, dogs, cats, stand-in figures for animation characters, stand-in figures for computer-generated images (CGIs), etc. The objects or people present at the live event, the movie shoot, etc., may or may not have staged or controlled positions, motions, angles, etc. Under techniques as described herein, sensors may be deployed in the live event, the movie shoot, etc., to collect telemetry and/or non-telemetry (non-audio) data relating to the objects or people present at the live event while audio feeds and video images are collected by audio and/or visual sensors within or without scenes of the live event, the movie shoot, etc. The telemetry and/or non-telemetry data may describe, but are not limited only to, any of current positions of the objects or people, current actions, etc., in the scenes of the live event, the movie shoot, etc.

In some embodiments, a position of an object or a person may be approximately determined by analyzing audio and/or video content collected with audio and/or visual sensors (e.g., using sound source separation techniques, using disparity information in addition to camera geometry, etc.). In some embodiments, some or all of the telemetry data and non-telemetry data may be captured directly and accurately (e.g., timed spatial information, spatial information in relation to time, etc.) by positional or motion sensors such as Global Positioning System sensors, laser-based positional and/or motion sensors, etc., other than the audio and/or visual sensors. For instance, a race car at a live racing event may carry a positional data transmitting device to transmit its GPS coordinates. A media encoding system may be configured to receive or establish the positions of the race car, its driver, an audio sensor in the race car, a camera in the race car, etc., based on the GPS coordinates which the media encoding system receives or collects from the positional data transmitting device in the race car, while the media encoding system receives or collects an audio feed of the audio sensor in the race car, a video feed of the camera in the race car, audio and/video feeds of other microphones and/or cameras present at the live racing event.

Pre-produced media assets such as audio sweeteners, synthetic sounds, pre-processed sounds, CGIs, animation characters, etc., may be integrated with audio and/or video feeds collected from a scene (at a live event, in a movie shoot, etc.) in an overall soundscape of the scene. The integration of the pre-produced media assets with the audio and/or video feeds from the scene may be based at least in part on the telemetry and/or non-telemetry data collected contemporaneously with the audio and/or video feeds from the scene. At a racing event, non-telemetry data (e.g., a sensor that senses gear positions or joystick motions, etc.) may indicate that a race car undergoes a gear shifting from a starting gear to an ending gear. An audio sweetener comprising a pre-recorded engine sound for the type of the race car may be set to be emitted from the location of the race car as determined based on telemetry information of the race car. At a movie shoot, telemetry data may indicate that a stand-in figure for an animation character may be at a certain position. The voice and image of the animation character may be superimposed, or used to replace some or all of the voice and image of the stand-in figure, at the location of the stand-in figure (e.g., at ten feet to the right of a viewer/listener, etc.).

More than one camera may be used at a live event, a movie shoot, etc. A user such as a director may choose which of the cameras is going live. A media encoding system as described herein can be configured to automatically adjust positions, relative motions, Doppler-effects, etc., of sound emitters in relation to a listener at the camera, based on the telemetry and/or non-telemetry data collected or acquired contemporaneously with audio feeds related to the sound emitters.

Audio and/or video feeds from audio and/or visual sensors outside a scene may be collected contemporaneously with audio and/or video feeds from the audio and/or visual sensors at the scene. At a racing event, the voices and/or images of commentators in a studio, the voices in team radios, etc., may be superimposed within an overall soundscape and/or video images of the racing event. The audio and/or video feeds from outside the scene may or may not be positioned based on positional information collected from the scene. In some embodiments, some or all of the audio and/or video feeds from outside the scene may be positioned at fixed spatial locations relative to a viewer/listener without regard to the telemetry information collected from the scene.

A variety of object-based audio formats may be used to encode audio sample data (e.g., PCM data, etc.) representing audio content and (e.g., non-PCM data, audio metadata, non-audio metadata, etc.) non-audio data into a plurality of audio objects. The plurality of audio objects may constitute or represent one of a live broadcast, a working version, a studio version, a pre-release version, a production version, an intermediate version, etc. Audio objects as described herein can be encoded, for example with Dolby Atmos technologies developed by Dolby Laboratories, Inc. of San Francisco, Calif., etc., transmitted, broadcast or downloaded to the downstream devices in a media data bitstream, stored in a media file, etc. A downstream recipient device can decode a media data bitstream as described herein and retrieve audio sample data and operational data for rendering or further manipulation.

A downstream recipient device may drive one or more speakers of a specific audio channel configuration to generate, based on both audio sample data decoded from the audio objects and the non-audio data, sound waves that represent individual audio content portions in the audio objects with correct spatial relationships between various sound emitters, etc.

As used herein, the term "audio channel configuration" refers to a configuration of audio channels or audio speakers with spatial, physical, acoustic, frequency response, etc., characteristics specific to a device, a device type, a location, a rendering environment, etc. An audio channel configuration may comprise one to many speakers such as two speakers, 30 speakers, 60 speakers, etc.

In some embodiments, mechanisms as described herein form a part of a broadcast system, a studio system, a media processing system, a user device, a home entertainment system, a handheld device, game machine, television, home theater system, tablet, mobile device, laptop computer, netbook computer, desktop computer, computer workstation, computer kiosk, various other kinds of media processing units, etc.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Media Encoding Systems

FIG. 1A illustrates an example media encoding system 100. The media encoding system 100 may comprise a live data interface 102, an emitter listener analyzer 104, an audio repository 110, a scene builder 106, and an object encoder 108. The media encoding system 100 may be a part of a broadcast system, an internet-based content server, an over-the-air network operator system, a movie production system, etc. The media encoding system 100 may be used to broadcast a live event at a racetrack (e.g., 200-1 of FIG. 2A, etc.), etc., record a movie scene (e.g., 200-2 of FIG. 2B, etc.) in the field or in a studio setting, etc.

In some embodiments, the live data interface (102) is configured to collect or receive (e.g., live, etc.) media data 114, (e.g., live, etc.) telemetry data 112, (e.g., live, etc.) non-telemetry data 116, etc., and generate a plurality of (e.g., initial, etc.) audio objects based at least on some or all of the media data (114), the telemetry data (112), the non-telemetry data (116), etc. For example, the live data interface (102) may be used to collect the media data (114), the telemetry data (112), the non-telemetry data (116) from a racetrack (e.g., 200-1 of FIG. 2A, etc.), a movie scene (e.g., 200-2 of FIG. 2B, etc.) in the field or in a studio setting, etc.

The media data (114) may comprise audio only, audiovisual, etc., media data. In some embodiments, the media data (114) may contain at least one feed of audio content (e.g., PCM samples, etc.) from at least one microphone at a scene. Feeds of audio content can be time-synchronized (e.g., based on timestamp, frame index, etc.) by live data interface 102 with one another and/or with other data collected by the live data interface (102), derived from another media data source, etc. For example, the media data (114) may contain feeds of audio content from microphones (e.g., as illustrated in FIG. 2A, 202-1, . . . , 202-6, etc.) at a scene of the race track (200-1 of FIG. 2A), microphones in a studio where commentators and guests are covering a live event of which the scene is a part, audio content as received by race team radio, etc. Some audio feeds may be derived from sound emitters within video image of the scene, while some other audio feeds may be derived from sound emitters outside video images of the scene. Some audio feeds may be derived within the scene, while some other audio feeds may be derived outside the scene.

In some embodiments, the media data (114) may contain at least one feed of video images (e.g., sequences of video frames, 2D video images, 3D images, multi-view images, etc.) from at least one camera at a scene. Feeds of video images can be time-synchronized (e.g., based on timestamp, frame index, etc.) by live data interface 102 with one another, with the feeds of audio content in the media data (114), and/or with other data collected by the live data interface (102), derived from another media data source, etc. For example, the media data (114) may contain feeds of video images from cameras (e.g., as illustrated in FIG. 2A, 204-1, 204-2, etc.) at a scene of the race track (200-1 of FIG. 2A), cameras in a studio where commentators and guests are covering a live event of which the scene is a part, video image as received wirelessly, etc. Some video images may be derived by cameras at the scene, while some other video images may be derived from cameras outside the scene.

Zero, one or more feeds of video images among the feeds of video images in the media data (114) may be correlated (e.g., collocated, adjacent, housed in a same device, aligned in the same spatial perspective, etc.) with zero, one or more feeds of audio content among the feeds of audio content in the media data (114). Zero, one or more feeds of video images among the feeds of video images in the media data (114) may not be correlated with any feed of audio content among the feeds of audio content in the media data (114). Zero, one or more feeds of audio content among the feeds of audio content in the media data (114) may not be correlated with any feed of video images among the feeds of video images in the media data (114).

The telemetry data (112) comprises telemetry measurements (e.g., spatial positions, spatial directions, spatial velocities, accelerations, etc.) of sound emitters (e.g., a race car in a race track, a player in a game, a driver in a race car, a stand-in figure in a movie scene, an actor in a movie scene, etc.), audio sensors (e.g., microphones placed around a race track, a stadium, a stage, a movie set, a commentator studio, a spectator booth, audience areas, inside a race car, worn by a player, unidirectional microphones at specific persons or objects, non-directional microphones, microphones with specific frequency responses, etc.), image sensors (e.g., cameras placed around a race track, a stadium, a stage, a movie set, a commentator studio, a spectator booth, audience areas, inside a race car, worn by a player, zoomed camera aiming at specific persons or objects, wide angle cameras, etc.), specific members of an audience, etc. The telemetry data (112) of a given telemetry type (e.g., positions of a car, velocity of a runner, positions and/or directions of a microphone, positions, directions, and/or velocity of a camera, etc.) can be represented by time-dependent (e.g., time-varied, etc.) functions, tables, sequences, etc.

For example, the telemetry data (112) may comprise feeds of telemetry measurements of microphones (e.g., as illustrated in FIG. 2A, 202-1, . . . , 202-6, etc.) at a scene of the race track (200-1 of FIG. 2A), cameras (e.g., as illustrated in FIG. 2A, 204-1, 204-2, etc.) at the scene of the race track (200-1 of FIG. 2A), race cars (e.g., as illustrated in FIG. 2A, 206-1, 206-2, etc.) specific audience members, etc.

The non-telemetry data (116) comprises non-audiovisual non-telemetry measurements (e.g., gear shift events in a race car, revolutions-per-minute measurements, temperature measurements, pressure measurements, heart rate measurements, etc.) of sound emitters, audio sensors, image sensors, specific members of an audience, etc.

For example, the non-telemetry data (116) may comprise feeds of non-telemetry measurements of microphones (e.g., as illustrated in FIG. 2A, 202-1, . . . , 202-6, etc.) at a scene of the race track (200-1 of FIG. 2A), cameras (e.g., as illustrated in FIG. 2A, 204-1, 204-2, etc.) at the scene of the race track (200-1 of FIG. 2A), race cars (e.g., as illustrated in FIG. 2A, 206-1, 206-2, etc.) specific audience members, etc.

An audio object may comprise audio sample data from one or more of the audio feeds, and may be rendered with sounds emitted from one or more audio channels in an audio channel configuration of a recipient system. An audio object may also comprise data or metadata separate from audio sample data in the audio object. The data in the audio object separate from the audio sample data may include but is not limited only to: any of telemetry and/or non-telemetry information—in the telemetry data (112) and/or non-telemetry data (116)—related to the audio sample data. For example, an audio object may be used to audio sample data from a feed of audio content from the microphone (202-3), and separate data for time-dependent positions of the microphone (202-3).

In some embodiments, the emitter listener analyzer (104) is configured to set one or more (e.g., time-varying, fixed, etc.) locations as positions of one or more listeners, analyze the telemetry data (112), the non-telemetry data (116), etc.; use results of the analysis to establish or generate one or more emitter-listener spatial relationships between and/or among one or more sound emitters and the one or more listeners; etc. An emitter-listener spatial relationship can be represented by time-dependent (e.g., time-varied, etc.) functions, tables, sequences, etc.

In some embodiments, a listener as described herein is collocated with a camera (e.g., 2D, 3D, multi-view, etc.) in the scene. The emitter listener analyzer (104) may be configured to determine a location of the listener as determined by a location of the camera (e.g., in the telemetry data 112, etc.), a viewing angle (or orientation) of the listener as determined by a viewing angle of the camera (e.g., in the telemetry data 112, etc.), etc. Based on the position, viewing angle (e.g., related to a 2D camera, a 3D camera, a multi-view camera, etc.), etc., of the listener, the emitter listener analyzer (104) can determine whether an audio sensor (e.g., a single microphone element, microphone array, stereo-microphone with inter-aural head barrier, etc.) is located with (e.g., at, near, adjacent to, collocated with, nearby, etc.) the listener or camera. If so, the emitter listener analyzer (104) may be configured to establish or generate a collocation emitter-listener relationship indicating collocation between the audio sensor and the listener.

For example, the emitter listener analyzer (104) may establish locations of the cameras (e.g., 204-1, 204-2, etc.) as positions of listeners (e.g., listener 1 at the location of the camera 204-1, listener 2 at the location of camera 204-2, etc.). The emitter listener analyzer (104) can analyze the feeds of telemetry measurements and/or non-telemetry measurements at the scene of the race track (200-1 of FIG. 2A) to determine that the microphones (e.g., 202-1, 202-2, etc.) are collocated with the cameras (e.g., 204-1, 204-2, etc.) or the listeners. Based on the analysis, the emitter listener analyzer (104) establishes or generates collocation emitter-listener relationships between the microphones (e.g., 202-1, 202-2, etc.) and the listeners (e.g., 204-1, 204-2, etc.).

After a listener is established, the emitter listener analyzer (104) may be configured to determine a location of a non-listener such as a sound emitter (e.g., race car 206-1, race car 206-2, etc.), an audio sensor (e.g., one of the microphones 202-3 through 202-5, etc.), an object or person that does not emit sound, an object or person that emits sound as a (e.g., insignificant, indistinguishable, etc.) part of overall audio content, etc. Based on the position, viewing angle, etc., of the listener and the location of the non-listener, the emitter listener analyzer (104) may establish or generate a non-collocation emitter-listener relationship indicating spatial relationships between the sound emitter and the listener. In some embodiments, the spatial relationships in the non-collation emitter-listener relationship include but are not limited only to: any of a distance, an angle (e.g., relative to a reference such as a viewing angle of a camera at which the listener is located, etc.), a relative velocity, etc. between the listener and the non-listener. For example, the emitter listener analyzer (104) may establish a listener as the camera 204-1. Based on the the position, viewing angle, etc., of the camera 204-1 and the location of the race car (206-1), the emitter listener analyzer (104) may establish or generate a non-collocation emitter-listener relationship indicating spatial relationships between the race car (206-1) and the listener (e.g., the camera 204-1, etc.).

In some embodiments, a media encoding system (100) may concurrently establish more than one listener (e.g., corresponding to more than one camera, etc.) at a given time. For example, the media encoding system (100) may concurrently establish both cameras 204-1 and 204-2 of FIG. 2A concurrently as listeners at a given time of a racing event at the race track 200-1 of FIG. 2A. A downstream device may be given the option of selecting one of the multiple listeners as the listener for playback or live broadcast.

In some other embodiments, a media encoding system (100) may (e.g., serially, etc.) establish only one listener (e.g., a selected camera among multiple cameras, etc.) at a given time. For example, the media encoding system (100) may establish only one listener (e.g., one of the cameras 204-1, 204-2, etc.) at a given time of a racing event at the race track 200-1 of FIG. 2A. When video images from a first camera at the scene are being broadcasted at a first time, the first camera is set as the listener at the first time. When video images from a second different camera at the scene are being broadcasted at a second different time, the second camera is set as the listener at the second time. For example, when video images from the camera (204-1) are being broadcasted, the camera (204-1) may be set as the listener at that time. At a later time when video images from the camera (204-2) are being broadcasted, the camera (204-2) may be set as the listener, replacing the camera (204-1) as the listener.

In the embodiments in which multiple listeners are established concurrently, it should be noted that a listener may also act as a non-listener relative to another listener. A non-collocation emitter-listener relationship may be generated between a listener and a different listener based on a perspective (or orientation) of one of the listeners. For example, when the camera (204-1) is set as the listener, the camera (204-2) becomes a non-listener relative to the camera (204-1).

In some embodiments, the media data repository (110) is configured to store none, some, or all of the media data (114), the telemetry data (112), the non-telemetry data (116), the emitter-listener relationships, etc. The media data repository (110) can also be configured to store media data sweeteners (e.g., audio sweeteners, video sweeteners, audio-visual sweeteners, still images, music, etc.). As used herein, a media data sweetener refers to a unit (e.g., a time duration, a sequence, a portion in an overall image frame, etc.) of audio only, video only, or audiovisual data that can be combined (e.g., audio mixed, superimposed with various degrees of transparency, etc.) with media data (e.g., 114, etc.) collected from a scene (e.g., a scene of a racing event at the race track 200-1 of FIG. 2A, etc.) into an overall media data stream for delivery to downstream devices; in some embodiments, one or more media data sweeteners can be archived into the media data repository (110) before an event (e.g., a racing event of which a scene is a part, etc.) from which the media data is to be combined with the one or more media data sweeteners.

For example, a pre-recorded portion of engine sound emitted by a race car of a particular type that shifts from one gear to another gear may be stored in the media data repository (110) in advance as a media data sweetener that can be combined or mixed with live audio content taken from a racing event at the race track 200-1 of FIG. 2A.

In some embodiments, the scene builder (106) is configured to establish a specific listener as a reference for a scene at a given time. The specific listener may be at a spatial location of a microphone only, a camera only, a combination of one or more cameras and one or more microphones, etc., with a specific spatial perspective—e.g., as represented by a spatial vector from the spatial location of the specific listener—at the scene. The scene builder (106) may be configured to determine and set the spatial location and perspective of the specific listener as a reference location and perspective for the scene. For example, the scene builder (106) may establish a listener at the location of the camera (204-2) as a reference for a scene of an event at a specific time of the event. The scene builder (106) may be configured to determine the spatial location and perspective of the listener for the scene as those of the camera (204-2).

In some embodiments, the scene builder (106) is configured to establish or generate one or more audio objects as audio objects for the scene at a given time of the event. These audio objects may be selected or modified from the plurality of initial audio objects generated by the live data interface (102) at the given time of the event, from a plurality of audio sweeteners in the media data repository, from a plurality of audio feeds such as radio intercepts, off-scene studio audio, etc.

In some embodiments, the audio objects for the scene comprise audio content from audio sensors at or near the listener. For example, for a listener at the camera (204-2), the scene builder (106) may select one or more audio objects that comprise audio content from the microphone (202-2) as some or all of the audio objects for the scene.

Alternatively, optionally, or additionally, in some embodiments, the audio objects for the scene comprise audio content from audio sensors at or near one or more objects or figures portrayed in video images of a camera that corresponds to the listener. For example, for a listener at the camera (204-2) that is generating video images of the race car (206-2), the scene builder (106) may select one or more audio objects that comprise audio content from the microphone (202-3) as some or all of the audio objects for the scene.

Alternatively, optionally, or additionally, in some embodiments, the audio objects for the scene comprise audio content from selected audio sweeteners in the media data repository (110). Some or all of the selected audio sweeteners (e.g., pre-recorded engine sound, etc.) may be correlated with one or more objects or figures portrayed in video images of a camera that corresponds to the listener. Some or all of the selected audio sweeteners (e.g., ambient sound, music, etc.) may not be correlated with one or more objects or figures portrayed in video images of a camera that corresponds to the listener. The audio objects for the audio sweeteners may comprise one or more time indicators indicating to downstream recipient devices as to when audio content in the audio objects should start playing. These time indicators can be set in response to detecting audio event triggers (e.g., actions, conditions, etc., that cause the audio events, etc.) occurring in the live event.

For example, when the race cars (e.g., 206-1, 206-2, etc.) are portrayed in video images of the scene at a given time, the scene builder (106) may select audio sweeteners of engine sounds generated during gear shifting specific to the types of the race cars as a part of audio content for the scene at the given time, and generate/establish one or more audio objects for the audio sweeteners as some or all of the audio objects for the scene at the given time. Such audio sweeteners may only last for finite time duration (e.g., while their respective race cars are in the video images of the scene, while the camera generating the video images is sufficiently close to their respective race cars, etc.). Each of the audio objects of the engine sounds generated during gear shifting may store time indicators for playing the audio sweeteners when the non-telemetry data (116) indicates that a corresponding race car is undergoing gear shifting.

Alternatively, optionally, or additionally, in some embodiments, the scene builder (106) may modify the audio objects for the scene at a given time based on time-dependent information (e.g., time-synchronous information, etc.) from one or more of the media data (114), the telemetry data (112), the non-telemetry data (116), emitter-listener relationships established by the emitter-listener analyzer (104), etc.

In some embodiments, one or more audio objects comprising one or more feeds of (e.g., live, original, etc.) audio content—as generated by one or more audio sensors, which may or may not be collocated with the listener, which may or may not be with the same perspective of the listener even if collocated with the listener, etc.—may be modified, enhanced, spatially or directionally shifted, etc., based on some or all of telemetry information of the one or more audio sensors in the telemetry data (112), the location and perspective of the (reference) listener, the emitter-listener relationships, so that the audio objects as modified, enhanced, etc., can be rendered by a downstream device in a spatially correct manner relative to the (reference) listener for the scene at a given time.

For example, at a given time, for a listener at the camera (204-2) that is generating video images of the race car (206-2), the scene builder (106) may modify, enhance, etc., the one or more audio objects that comprise audio content from the microphone (202-3), among the audio objects for the scene, based on some or all of telemetry information of the microphone (202-3), the position and perspective of the listener at the camera (204-2), an emitter-listener relationship between the microphone (202-3) and the listener, etc. The one or more audio objects, as modified, enhanced, etc., can be rendered by a downstream device in a spatially correct manner relative to the (reference) listener for the scene at the given time. The original audio content from the microphone (202-3) can be distance-attenuated as appropriate in the modified audio objects based on the distance in the emitter-listener relationship. The original audio content from the microphone (202-3) can also be set or shifted in the modified audio objects as coming from a particular angle, height, etc., that match the particular angle, height, etc., as specified in the emitter-listener relationship between the microphone (202-3) and the listener at the given time. The original audio content from the microphone (202-3) can also be Doppler-shifted (e.g., frequency shift due to relative motion between a sound emitter and a listener, etc.) in the modified audio objects as coming from a moving race car with a particular velocity relative to the listener that matches the particular velocity as specified in the emitter-listener relationship between the microphone (202-3) and the listener at the given time.

In some embodiments, one or more audio objects comprising one or more audio sweeteners—as retrieved from the media data repository (110)—may be modified, enhanced, spatially or directionally positioned, etc., based on some or all of the location and perspective of the (reference) listener, the emitter-listener relationships, etc., so that the one or more audio sweeteners in the audio objects as modified, enhanced, etc., can be rendered by a downstream device in a specific spatial relationship with the (reference) listener for the scene at a given time. In some embodiments, the specific spatial relationship may be established in reference to (e.g., telemetry information with, etc.) a particular object (e.g., a race car, etc.), a particular location (e.g., a pit stop, a particular audience location, etc.), a particular trajectory (e.g., a race track, a ramp, etc.), a particular emitter-listener relationship (e.g., between a race car and the listener, etc.), etc., in the scene at the given time.

For example, at a given time, for a listener at the camera (204-2) that is generating video images of the race car (206-2), the scene builder (106) may modify, enhance, etc., the one or more audio objects that comprise an audio sweetener with engine sound generated during gear shifting (e.g., different engine sounds for shifting between different combinations of pre-shift and post-shift gears, etc.) from a type of race car like the race car 206-2, among the audio objects for the scene, based on some or all of the position and perspective of the listener at the camera (204-2), an emitter-listener relationship between the race car (206-2) and the listener, etc. The one or more audio objects, as modified, enhanced, etc., can be rendered by a downstream device in a specific spatial relationship with the (reference) listener for the scene at the given time. The engine sound for the race car (206-2) can be positioned in coincidence with the race car (206-2), and distance-attenuated as appropriate in the modified audio objects based on the distance in the emitter-listener relationship between the race car (206-2) and the listener. The engine sound can also be set or shifted in the modified audio objects as coming from a particular angle, height, etc., that match the particular angle, height, etc., as specified in the emitter-listener relationship between the race car (206-2) and the listener at the given time. The engine sound can also be Doppler-shifted (e.g., frequency shift due to relative motion between the race car 206-2 and a listener, etc.) in the modified audio objects as coming from a moving race car with a particular velocity relative to the listener that matches the particular velocity as specified in the emitter-listener relationship between the race car (206-2) and the listener at the given time.

In some embodiments, one or more audio objects comprising off-scene audio feeds such as radio intercepts, off-scene studio audio, etc., —as received in the media data (112)—may be modified, enhanced, spatially or directionally positioned, etc., based on some or all of the location and perspective of the (reference) listener, the emitter-listener relationships, etc., so that the one or more audio sweeteners in the audio objects as modified, enhanced, etc., can be rendered by a downstream device in a specific spatial relationship with the (reference) listener for the scene at a given time. In some embodiments, the specific spatial relationship may be established not in reference to (e.g., telemetry information with, etc.) a particular object (e.g., a race car, etc.), a particular location (e.g., a pit stop, a particular audience location, etc.), a particular trajectory (e.g., a race track, a ramp, etc.), a particular emitter-listener relationship (e.g., between a race car and the listener, etc.), etc., in the scene at the given time. Rather, an audio object comprising audio content of in-studio commentators' voices may be positioned near the listener, for example, at the right ear of the listener, while an audio object comprising audio content derived from race team radio may be positioned near the listener, for example, at the left ear of the listener.

As described herein, a media data bitstream can be a part of an overall video bitstream (e.g., for a video program or broadcast, etc.). The media data bitstream can be accessed from a server, a computer, a media storage device, a media database, a media file, etc. The media data bit stream may be broadcasted, transmitted or received through one or more wireless or wired network links. A media data bitstream may also be communicated through an intermediary such as one or more of network connections, USB connections, wide area networks, local area networks, wireless connections, optical connections, buses, crossbar connections, serial connections, etc.

As illustrated in FIG. 1A, the object encoder (108) can be configured to receive audio objects for the scene from the scene builder (106) and to encode the audio objects into a media data bitstream (120) or at least a portion of such a bitstream.

3. Media Decoding Systems

Figure 1B:
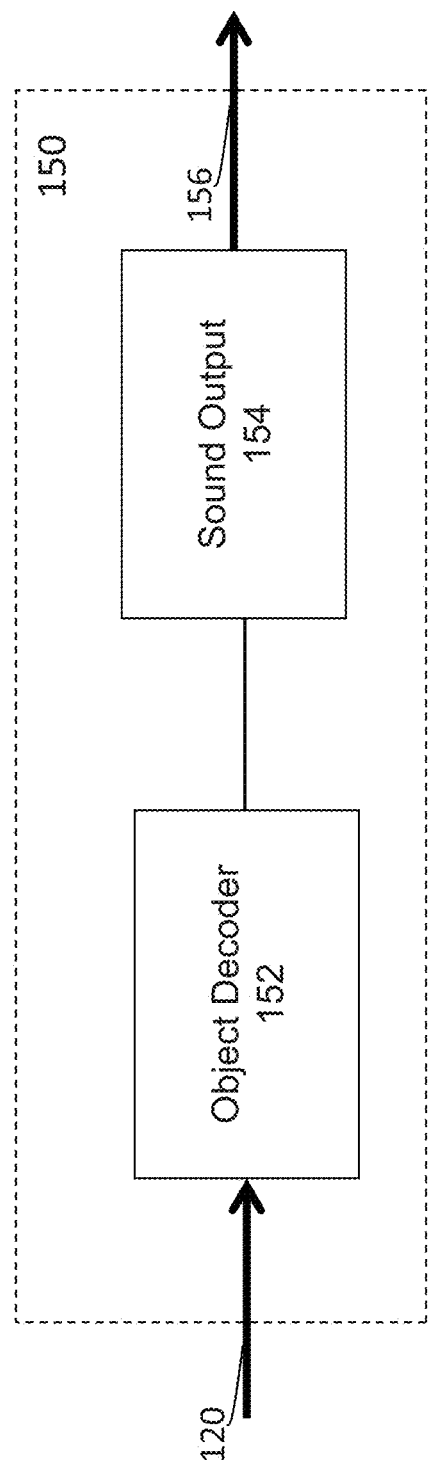
Figure 2A:
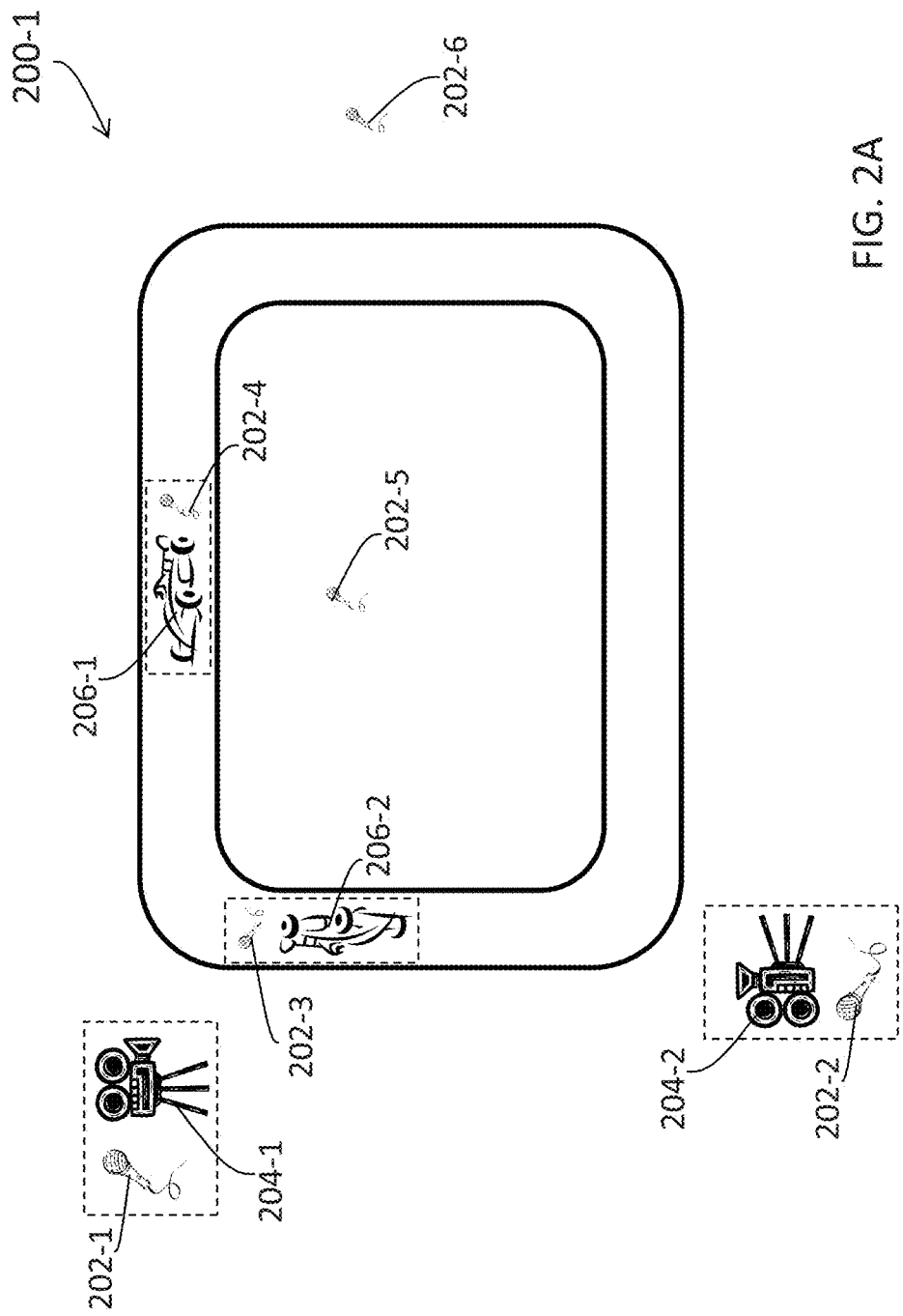
FIG. 2A and FIG. 2B illustrate example scenes at a racing event and in a movie studio, respectively.

FIG. 1B illustrates an example media decoding system 150. The media decoding system 150 may comprise an object decoder 152, a sound output 154, etc. In some embodiments, some or all components of the media decoding system 150 may be a part of, or operate in conjunction with, a playback device.

In some embodiments, the object decoder (152) is configured to receive a media data bitstream (e.g., 120), and decode at least a portion of the bitstream (120) into a plurality of audio objects. In some embodiments, the media decoding system (150) is further configured to decode or retrieve audio content from the plurality of audio objects as received in the bitstream (120). In some embodiments, the media decoding system (152) is configured to determine an audio channel configuration that is to be used to render the plurality of audio objects.

In some embodiments, the sound output (154) is configured to generate (e.g., multi-channel, etc.) channel-specific audio data (156) for the determined audio channel configuration based on the plurality of audio objects. The multi-channel channel-specific audio data (156) may be used to drive speakers, headphones, etc., represented in the audio channel configuration.

Additionally and/or optionally, in some embodiments, the media decoding system (150) can be configured to perform other operations relating to preprocessing of the audio content, post-processing of the audio content, the performance of the audio content, etc.

Any of the components depicted (e.g., FIG. 1A, FIG. 1B, etc.) may be implemented as one or more processes and/or one or more IC circuits (e.g., ASICs, FPGAs, etc.), in hardware, software, or a combination of hardware and software.

Techniques as described herein can be used with a variety of audio channel configurations corresponding to a variety of different surround sound configurations (e.g., 2.0, 3.0, 4.0, 4.1, 4.1, 5.1, 6.1, 7.1, 7.2, 10.2, a 10-60 speaker configuration, a 60+ speaker configuration, etc.) and a variety of different rendering environment configurations (e.g., cinema, park, opera houses, concert halls, bars, homes, auditoriums, etc.). A recipient device as described herein can be configured to mix audio content from a plurality of audio objects into a final audio mix optimized for the particular audio channel configuration. The recipient device may be configured to render a soundscape in which a sound emitter is accurately positioned and timed based on time-dependent positional information in one or more audio objects decoded from a media data signal.

A variety of types of recipient devices (e.g., media encoding system 100, media decoding system 150, etc.) may receive audio objects in a media data bitstream (e.g., 120, etc.) in one or more of a variety of ways, such as wirelessly, via a wired connection, through a file, via an internet download, etc. Any of these recipient devices may decode the media data bitstream (120) to derive the audio elements and specific control data for the audio elements. Pre-processing and/or post-processing (e.g., through Dolby Surround technologies, Dolby Atmos technologies, etc.) operations may be optionally performed on the audio object, the final mix, system components in the recipient device, audio speakers (e.g., volume, frequency response, spatial direction, etc.), display devices, lighting devices, etc., based at least in part on non-audio data received in the audio objects.

Techniques as described herein use one or more of a variety of object-based audio formats in which audio content is distributed (e.g., stored, transmitted, mastered, received, etc.) as a collection of audio objects. A recipient device can combine (e.g., mixed together, etc.) the received audio objects at the time of playback. Individual audio objects may comprise individual audio content portions. Apart from an individual audio content portion, an audio object may include separate non-audio data, which, for example, may include positional data of sound emitters in the individual audio content portions in a three-dimensional space. The positional data can be used to enable the creation of complex 3-dimensional sound fields at the time of playback of the individual audio content portions.

In addition to the positional data, other mix-related control data, features, parameters, etc., can also be conveyed with or within these audio objects. These may include gain levels (e.g., volume, individual channel levels, etc.), tone controls (e.g., treble/bass/equalization parameters, etc.), dynamics processing (e.g., compression/expansion, etc.), a variety of more or less sophisticated signal processing parameters (e.g., for reverb, delay, flanging, distortion, etc.), etc.

At one extreme, every individual audio content portion (e.g., an audio content portion recorded by microphone 204-1, etc.) can be conveyed in a separate audio object (which may result in a media data bit stream requiring a very high data rate). At the other extreme, some of all of a plurality of individual audio content portions can be mixed together beforehand to create a final audio mix, which can then be conveyed as a simple multi-channel object to drive multiple channels in an audio channel configuration.

In some embodiments, a media encoding system (e.g., 100, etc.) as described herein can be used as a front-end to a content chain that enables broadcasting live events and using (e.g., live, etc.) audio objects to represent real-world objects in the live events.

In some embodiments, a media encoding system (e.g., 100, etc.) as described herein can be used as a tool for automated production of on-set sound at a movie shoot.

In some embodiments, a media encoding system (e.g., 100, etc.) as described herein can be used to produce audio and/or visual content for an animated film by collecting real-world time-dependent telemetry data with a variety of real-world objects, real-world characters, real-world stand-in figures, etc., in a movie shoot. The media encoding system (100), or a downstream production system, can replace sounds and/or images of some or all of the real-world objects, real-world characters, real-world stand-in figures, etc., with sounds and/or images representing animation objects, animation characters, etc., based on the collected real-world time-dependent telemetry data with the real-world objects, real-world characters, real-world stand-in figures, etc., in the movie shoot. Additionally, alternatively, or optionally, the media encoding system (100), or a downstream production system, can superimpose sounds and/or images representing animation objects, animation characters, computer-generated image (CGI), etc., at the times and positions of the real-world objects, real-world characters, real-world stand-in figures, etc., based on the collected real-world time-dependent telemetry data with the real-world objects, real-world characters, real-world stand-in figures, etc., in the movie shoot.

Figure 2B:
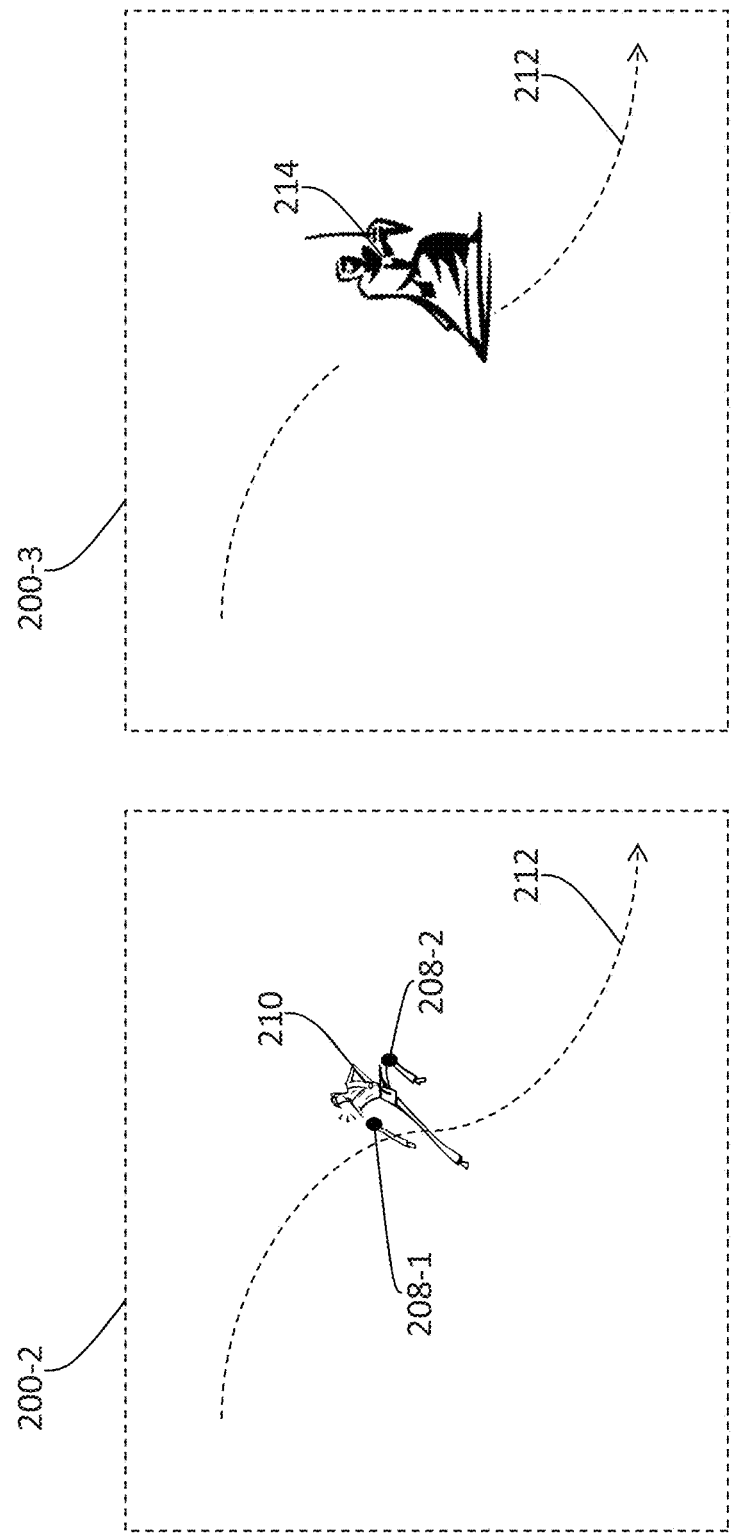

For example, as illustrated in FIG. 2B, a stand-in FIG. 210 may act together with real-word objects and figures in a scene 200-2 at a movie studio. Telemetry information (212) such as paths, trajectories, spatial directions, etc., of different parts of the stand-in figure may be collected using sensors (e.g., 208-1, 208-2, etc.) from the scene (200-2) at the movie studio. Non-telemetry information such as camera zoom settings, temperature, ambient luminance, etc., may also be collected using sensors (e.g., 208-1, 208-2, etc.) from the scene (200-2) at the movie studio. Based at least in part on the collected telemetry information (212), a production system may superimpose an animation figure or a CGI 214—which may or may not be based on a real person—over the stand-in figure in video images captured while the telemetry information (212) was being captured from the scene (200-2) to generate video images of a composite scene (200-3) that may be released to cinemas, consumers, internet, etc. The animation figure or CGI (214) appearing in the composite scene (200-3) may, but is not limited only to, follow the same paths, trajectories, spatial directions, etc., as in the scene (200-2) at the movie studio.

4. Real Time Creation of a Surround Sound Scene

Instead of painstakingly designing an audio mix by adding real-world or imaginary objects, devising paths of movement, etc., often through many iterations, techniques as described herein can automatically create audio objects with non-audio data while the actions of a (e.g., live, etc.) event unfolds. The audio objects with the non-audio data can be transmitted in real time (e.g., instantaneously, etc.) or near real time (e.g., within a small time delay in terms of seconds, fractions of a second, etc.) to downstream devices and be rendered in a variety of audio channel configurations.

Figure 3:
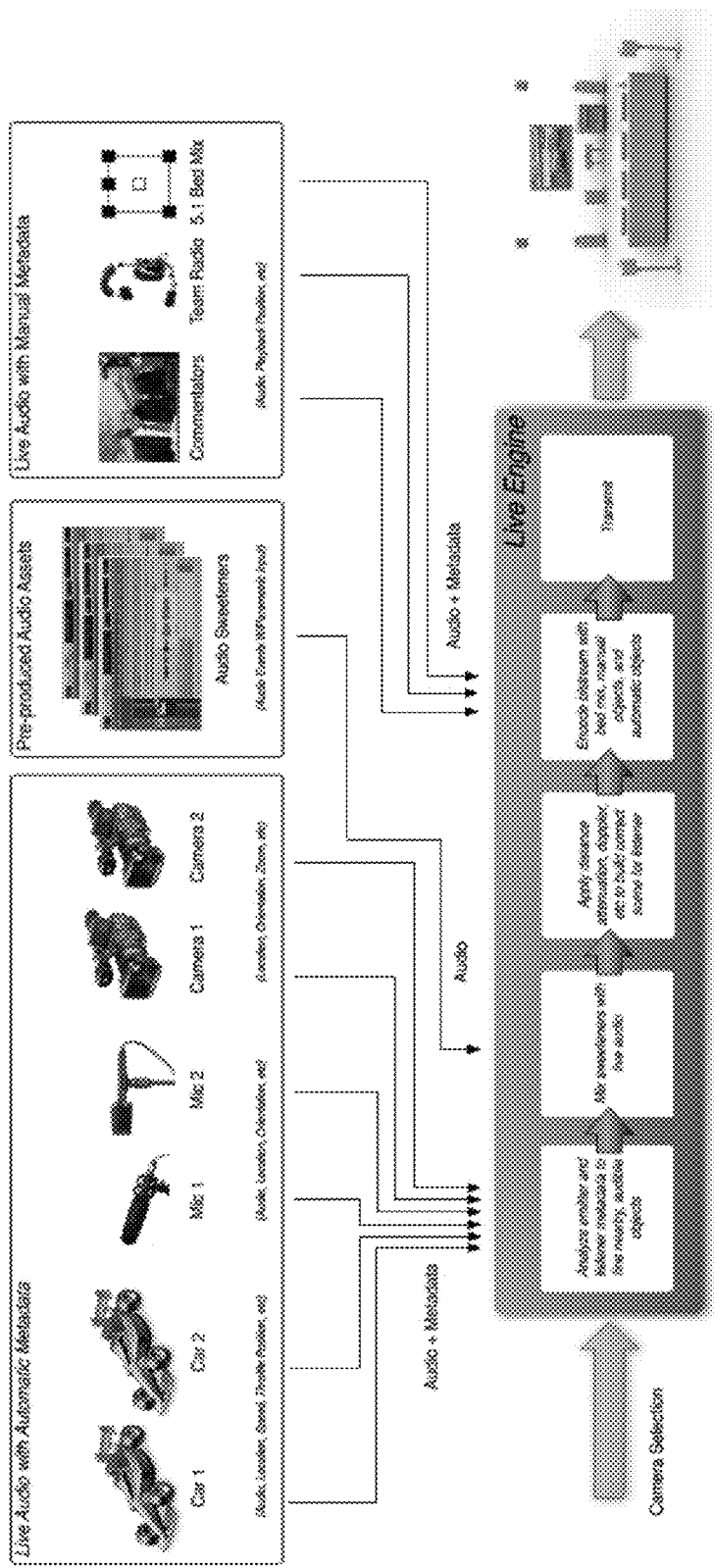
FIG. 3 illustrates an example pipeline used to create a surround sound scene.

FIG. 3 illustrates an example pipeline used to create a surround sound scene. For the purpose of illustration only, the surround scene may be a live event such as a Formula 1 race, etc., where a large amount of media data (e.g., 114, etc.), telemetry data (e.g., 112, etc.), non-telemetry data (e.g., 116, etc.), etc., about what is happening at the event are collected. The media data may include but is not limited only to: any of audio feeds from microphones (e.g., Mic 1 which may be 202-1 of FIG. 2A, Mic 2 which may be 202-2 of FIG. 2A, etc.), video feeds from cameras (e.g., Camera 1 which may be 204-1 of FIG. 2A, Camera 2 which may be 204-2 of FIG. 2A, etc.), etc. The telemetry data (112) may include but is not limited only to: any of positions of race cars (e.g., Car 1 which may be 206-1 of FIG. 2A, Car 2 which may be 206-2 of FIG. 2A, etc.) on the race track. As illustrated in FIG. 3, in the racing event, data related to audio, location, speed, throttle position, etc., may be collected from sensors in or near a race car; data related to audio, location, orientation, etc., may be collected from a microphone; date related to video, location, orientation, zoom, etc., may be collected from a camera; etc.

Under techniques as described herein, the telemetry data (112) and/or the non-telemetry data (116) may be used for audio production. For example, a media encoding system (e.g., 100, etc.) may be configured to receive the telemetry data (112), the media data (114), the non-telemetry data (116), etc., in the form of (e.g., live, etc.) audio and (e.g., automatically generated as the event is unfolding, etc.) metadata. The media encoding system may comprise a live engine that implements techniques as described herein. The live engine may be configured to automatically create some or all of a surround sound scene—from the point of view of a dynamically selectable camera among a plurality of cameras that are generating video images that may be used in a live or near-live broadcast of the event—that adjusts to the live actions as they happen.

The live engine may be configured to access or retrieve pre-produced audio assets such as audio sweeteners, etc. Some or all of sounds represented by the pre-produced audio assets may be used as audio events in the overall surround sound scene. An audio event may refer to a specific sound that may not be constantly present in the live audio but may be set to be audible in correlation with certain audio event triggers (e.g., actions, conditions, etc., that cause the audio events, etc.) occurring in a live event, etc. Examples of parametric input may include but are not limited only to: any of an indication of certain gear shifting event of a certain type of race car, an indication of current engine speed, location of a race car, etc. Examples of an audio sweetener may include but are not limited only to: any of real, synthesized or semi-synthesized engine noises that can be used to further enhance the audio experience of a non-spectator audience. The integration of pre-produced audio assets with live audio may be based on parametric input including but not limited only to: any of specific times (e.g., gear shifting, etc.), specific durations (e.g., a second, a fraction of second, etc.), specific spatial locations (e.g., where a specific race car is, etc.), specific Doppler-shifted audio frequencies (e.g., representing a relative velocity between a specific race car and an observer, a listener, a camera, etc.), etc.

In some embodiments, the media data (114), the telemetry data (112), the non-telemetry data (116), etc., as received by the live engine may comprise live audio data—from the event—with manually generated metadata. Examples of live audio data may be audio feeds of commentators, audio feeds from team radios, an audio bed mix comprising music, etc. Examples of manually generated metadata may include but are not limited only to: any of manually generated playback positions (e.g., spatial locations relative to a listener, etc.) for audio feeds of commentators, team radios, music, etc. The manually generated playback positions may, but are not limited to, correlate with positional information in the telemetry data (112). For example, an audio feed of commentators may be placed near a listener's ear; a team radio may be placed at a different direction from the listener; etc.

The live engine as described herein may be configured to select any of a plurality of cameras to provide video images of a scene at the racing event. In some embodiments, in response to receiving an indication of a selection of a specific camera (e.g., among the plurality of cameras, etc.), the live engine, or an emitter-listener analyzer (e.g., 106 of FIG. 1A, etc.) therewith, analyzes emitter and listener metadata in the media data (114), the telemetry data (112), the non-telemetry data (114), etc., to find one or more audio objects among a plurality of audio objects (e.g., generated by a live data interface (e.g., 102 of FIG. 1A, etc.). These audio objects may correspond to audio feeds from audio sensors nearby in relation to the specific camera. The live engine may be configured to determine one or more emitter-listener relationships based on the media data (114), the telemetry data (112), the non-telemetry data (114), etc.

As used herein, an emitter-listener relationship refers to a space-time relationship (e.g., positional, relative velocity, relative angle, etc.) between an object—which may be emitting sounds (whether audible to audio sensors near a listener or not) or may be assigned with an audio sweetener—and a listener such as a camera, a microphone near a camera, etc.

The live engine as described herein may be configured to mix audio sweeteners with other audio objects in the overall soundscape scene. The audio sweeteners may be correlated with certain objects, certain actions, certain positions, etc., based on the collected media data (114), telemetry data (112), non-telemetry data (116), emitter-listener relationships, etc. Additionally, optionally or alternatively, the live engine may be configured to apply distance attenuation, Doppler-effect, etc., to original sounds in the audio sweeteners based on telemetry and/or non-telemetry information in the collected media data (114), telemetry data (112), non-telemetry data (116), emitter-listener relationships, etc.

The live engine as described herein may be configured to encode some or all of the audio objects into a media data bitstream. The encoded audio objects may include but are not limited only to, any of audio feeds generated at the scene, audio objects comprising pre-generated sounds (e.g., generated before the racing event, etc.), audio objects comprising the audio bed mix, audio feeds of commentators, audio feeds of team radios, etc.

The media data stream with the encoded audio objects may be received by downstream devices to render the overall sound scape scene that is consistent with concurrently rendered video images of the specific camera.

5. Example Process Flows

Figure 4A:
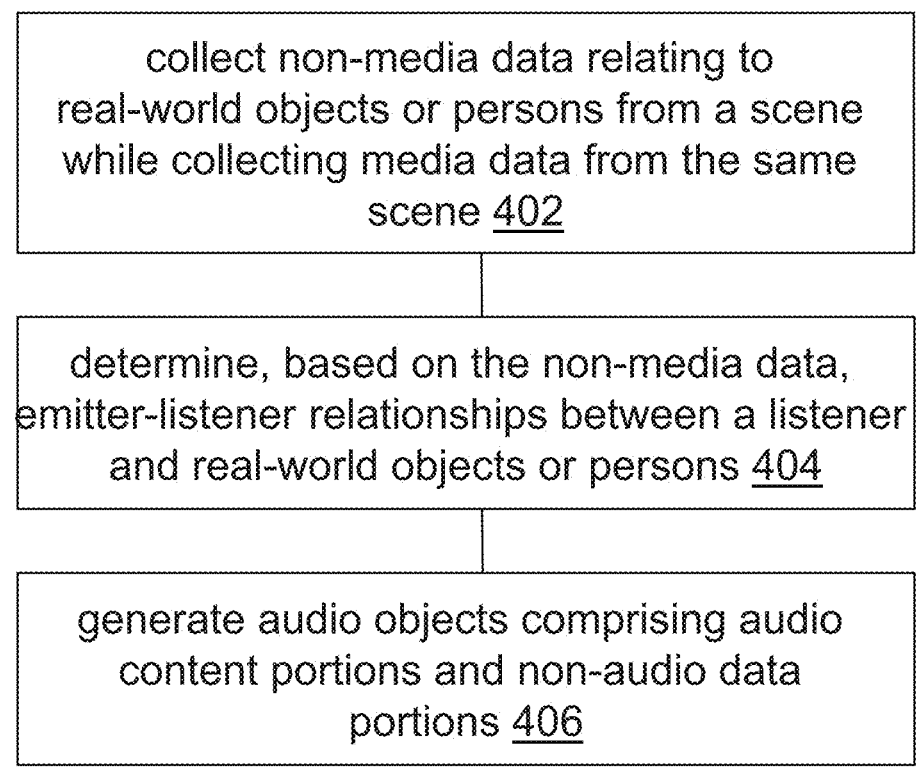
FIG. 4A through FIG. 4C illustrate example process flows.
Figure 4B:
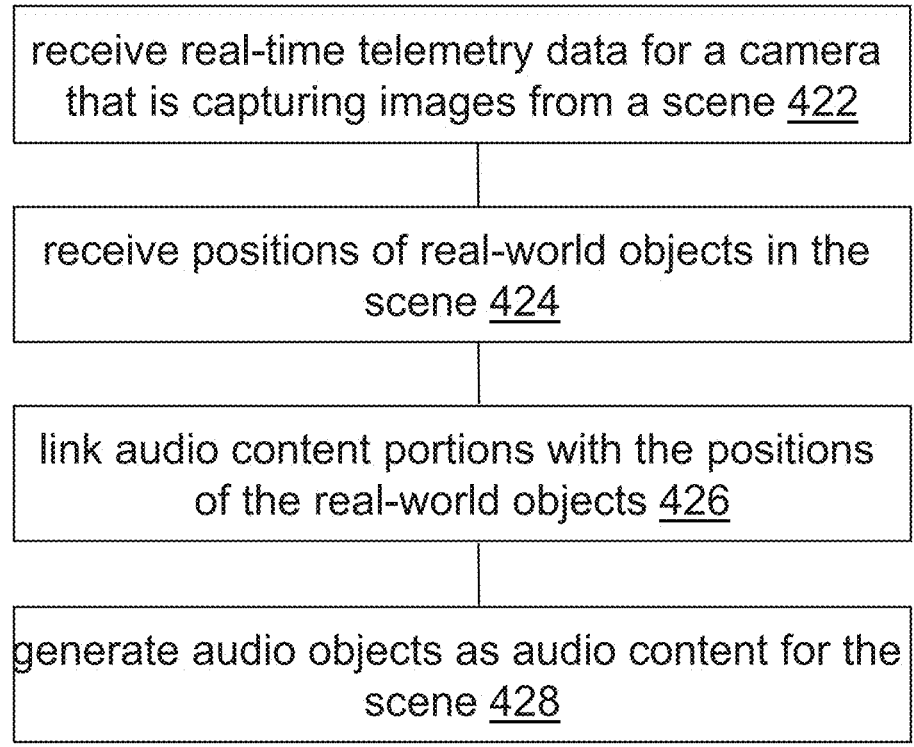
Figure 4C:
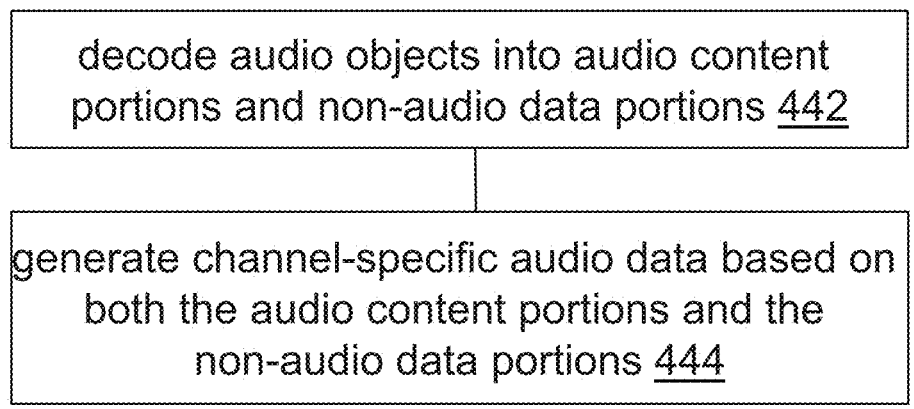

FIG. 4A, FIG. 4B and FIG. 4C illustrate example process flows. In some embodiments, one or more computing devices or units in a media processing system may perform this process flow.

FIG. 4A illustrates an example process of generating audio objects. In block 402 of FIG. 4A, a first device such as a media encoding system 100 of FIG. 1A, etc., collects non-media data relating to a plurality of real-world objects or persons from a scene while collecting media data from the same scene. The media data comprise one or more of audio data only or audiovisual data, whereas the non-media data comprise one or more of telemetry data or non-telemetry data.

In block 404, the media encoding system (100) determines, based at least in part on the non-media data relating to the plurality of real-world objects or persons in the scene, one or more emitter-listener relationships between a listener and one or more real-world objects or persons in the plurality of real-world objects or persons.

In block 406, the media encoding system (100) generates a plurality of audio objects comprising a plurality of audio content portions and a plurality of non-audio data portions. At least one audio object in the plurality of audio objects is generated based at least in part on the one or more emitter-listener relationships between the listener and the one or more real-world objects or persons in the plurality of real-world objects or persons.

FIG. 4B illustrates another example process of generating audio objects. In block 422 of FIG. 4B, a first device such as a media encoding system 100 of FIG. 1A, etc., receives real-time telemetry data for a camera that is capturing images from a scene.

In block 424, the media encoding system (100) receives one or more positions of one or more real-world objects in the scene.

In block 426, the media encoding system (100) links one or more audio content portions with the one or more positions of the one or more real-world objects. The one or more audio content portions represent corresponding audio sample data portions for the one or more real-world objects; each of the one or more audio content portions represents a specific audio sample data portion for a respective real-world object of the one or more audio source elements.

In block 428, the media encoding system (100) generates a plurality of audio objects as audio content for the scene. The plurality of audio objects comprises one or more audio objects that store the one or more audio content portions for the one or more real-world objects and the one or more positions of the one or more real-world objects in the scene.

FIG. 4C illustrates another example process of generating audio objects. In block 442 of FIG. 4C, a first device such as a media decoding system 150 of FIG. 1B, etc., decodes a plurality of audio objects into a plurality of audio content portions and a plurality of non-audio data portions. The plurality of audio objects represents audio content for a scene. The plurality of non-audio data portions comprises one or more spatial data portions indicating one or more positions of one or more sound emitters relative to a specific perspective of a listener at a specific location at the scene. At least one audio object in the plurality of audio objects comprises at least one spatial data portion generated based at least in part on non-media data collected from the scene.

In block 444, the media decoding system (150) generates channel-specific audio data based on both the plurality of audio content portions and the plurality of non-audio data portions. The channel-specific audio data may be used to drive an audio channel configuration with one or more speakers, for example, in a home media room, etc.

In an embodiment, at least one of the one or more positions of the one or more real-world objects is tracked by one or more non-audio-visual sensors.

In an embodiment, the scene is a part of a live event; and wherein the plurality of audio objects is delivered to downstream devices (e.g., the media decoding system 150, etc.) in a live broadcast of the live event.

In an embodiment, the at least one audio object in the plurality of audio objects comprises an audio content portion not generated by any audio sensors at the scene. In an embodiment, the at least one audio object in the plurality of audio objects comprises an audio content portion generated before a live event of which the scene is a part. In an embodiment, the plurality of audio objects further comprises one or more audio objects with one or more audio content portions generated by audio sensors at the scene. In an embodiment, the plurality of audio objects constitutes audio content of the scene.

In an embodiment, the scene is a part of a film shoot; and the plurality of audio objects is delivered as audio content for the scene to a movie production system.

In an embodiment, the listener relates to a specific location and a specific perspective at a given time; the at least one audio object in the plurality of audio objects comprises a specific spatial data portion that enables a downstream device to render the at least one audio object in the plurality of audio objects relative to the specific perspective from the specific location of the listener at the given time at the scene. In an embodiment, the specific perspective is that of a camera at the specific location.

In an embodiment, the plurality of audio objects is a part of an audiovisual signal that includes a video data portion that enables the downstream device to render the video data portion relative to the same specific perspective from the same specific location of the listener at the given time at the scene.

In an embodiment, a second listener relates to a second specific location and a second specific perspective at a different given time; the plurality of audio objects further comprises a second spatial data portion that enables the downstream device to render the plurality of audio objects relative to the second specific perspective from the second specific location at the different given time at the scene.

In an embodiment, the media encoding system (100) is further configured to perform: while generating a time sequence of video images of the scene, tracking a position of a stand-in figure in the time sequence of video images; superimposing one of an animation character or a computer-generated imagery portion at the position of the stand-in figure in the time sequence of video images; linking an audio object in the plurality of audio objects with the position of the stand-in figure, the audio object in the plurality of audio objects comprising an audio content portion for the one of the animation character or the computer-generated imagery portion.

In an embodiment, the plurality of audio objects can be transmitted to, or received by, a downstream media device in one of media data bitstreams, audio signals, audiovisual signals, media data files, media data containers, or media data structures.

In an embodiment, the plurality of audio objects is a part of a media data signal encoded with one or more of: audio content only or both audio content and video content.

In an embodiment, the media encoding system (100) is further configured to apply attenuation to one or more audio content portions in one or more audio objects in the plurality of audio objects based on one or more spatial distances between the listener and one or more sound emitters represented by the one or more audio objects.

In an embodiment, the media encoding system (100) is further configured to apply Doppler-effect processing (e.g., simulate Doppler effect caused by relative motions between an emitter and a listener, etc.) to one or more audio content portions in one or more audio objects in the plurality of audio objects based on one or more relative velocities between the listener and one or more sound emitters represented by the one or more audio object.

In an embodiment, the plurality of audio objects comprises one or more audio objects representing audio events that produce specific sounds in response to detecting occurrences of specific audio event triggers as determined from the non-media data collected from the scene.

In an embodiment, an apparatus comprising a processor and configured to perform any one of the methods as described herein.

In an embodiment, a non-transitory computer readable storage medium, comprising software instructions, which when executed by one or more processors, cause performance of any one of the methods as described herein. Note that, although separate embodiments are discussed herein, any combination of embodiments and/or partial embodiments discussed herein may be combined to form further embodiments.

6. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
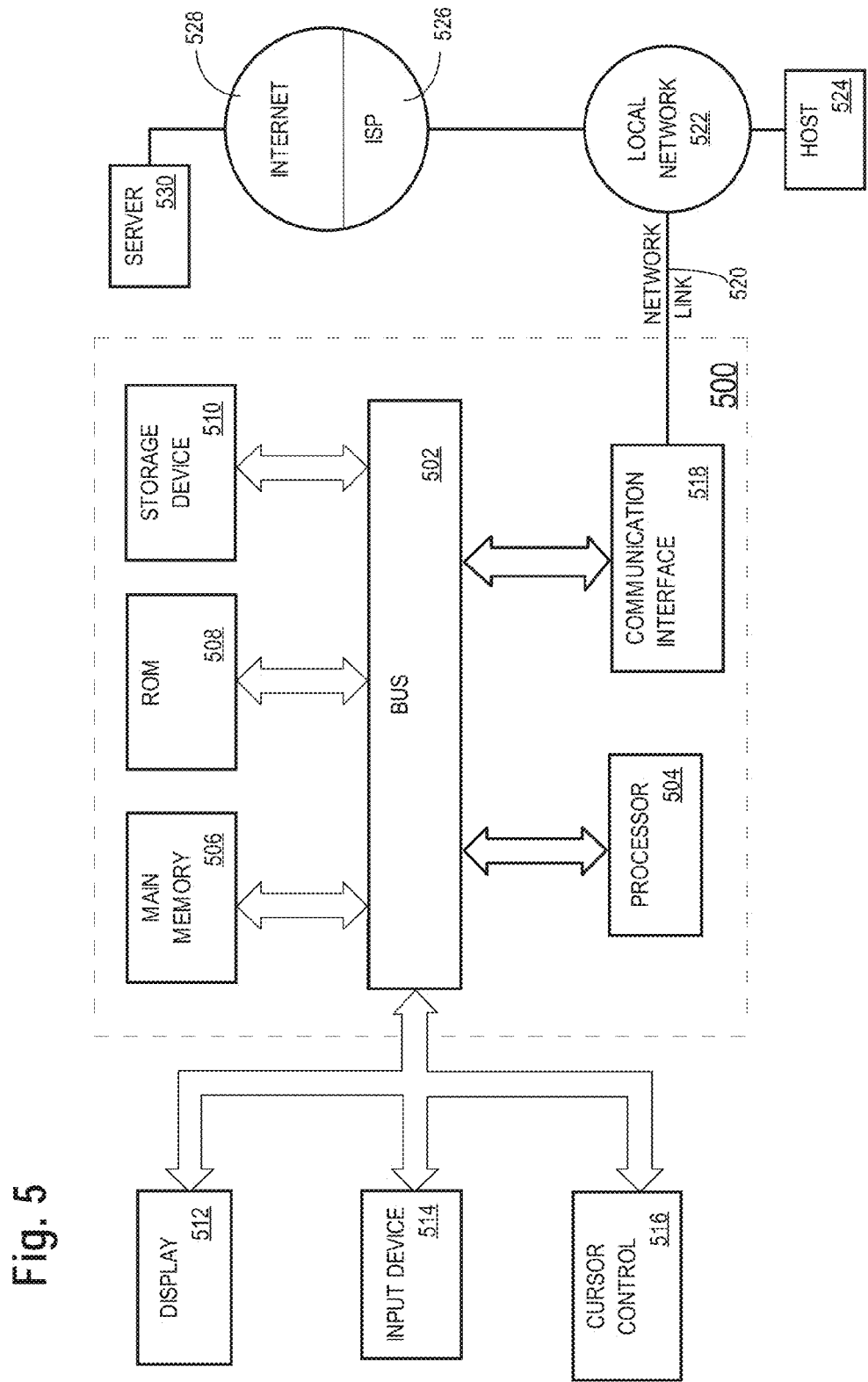
FIG. 5 illustrates an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is device-specific to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using device-specific hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

7. Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, feature, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
    collecting non-media data relating to a plurality of real-world objects or persons from a scene while collecting media data from the same scene, the media data comprising one or more of audio data only or audiovisual data, the non-media data comprising one or more of telemetry data or non-telemetry data;
    wherein the media data comprising a specific portion of audio data collected from an audio feed of an audio sensor near or at a specific real-world object or person in the plurality of real-world objects or persons;

determining, based at least in part on the non-media data relating to the plurality of real-world objects or persons in the scene, one or more emitter-listener relationships between a listener and one or more real-world objects or persons in the plurality of real-world objects or persons;

modifying, based on an emitter-listener relationship between the listener and the specific real-world object or person, the specific portion of audio data into a modified portion of audio data, the emitter-listener relationship being among the one or more emitter-listener relationships;

generating a plurality of audio objects comprising a plurality of audio content portions and a plurality of non-audio data portions, at least one audio object in the plurality of audio objects being generated based at least in part on the one or more emitter-listener relationships between the listener and the one or more real-world objects or persons in the plurality of real-world objects or persons;

wherein the at least one audio object includes a specific audio object comprising the modified portion of audio data;

wherein the method is performed by one or more computing devices.

2. The method as recited in claim 1, further comprising linking one or more audio objects with one or more positions of the one or more real-world objects or persons.

3. The method as recited in claim 1, wherein the scene is a part of a live event; and wherein the plurality of audio objects is delivered to downstream devices in a live broadcast of the live event.

4. The method as recited in claim 1, wherein the plurality of audio objects further comprises one or more audio objects with one or more audio content portions generated by audio sensors at the scene.

5. The method as recited in claim 1, wherein the scene is part of a production not for live transmission, and wherein the plurality of audio objects is delivered as audio content for the scene to a post-production system.

6. The method as recited in claim 1, wherein the at least one audio object in the plurality of audio objects comprises an audio content portion generated before a live event of which the scene is a part.

7. The method as recited in claim 1, wherein the listener represents a specific location and a specific perspective at a given time, wherein the at least one audio object in the plurality of audio objects comprises a specific spatial data portion that enables a downstream device to render the at least one audio object in the plurality of audio objects relative to the specific perspective from the specific location of the listener at the given time at the scene.

8. The method as recited in claim 1, further comprising:
while generating a time sequence of video images of the scene, tracking a position of a stand-in figure in the time sequence of video images;
superimposing one of an animation character or a computer-generated imagery portion at the position of the stand-in figure in the time sequence of video images;
linking an audio object in the plurality of audio objects with the position of the stand-in figure, the audio object in the plurality of audio objects comprising an audio content portion for the one of the animation character or the computer-generated imagery portion.

9. The method as recited in claim 1, further comprising outputting the plurality of audio objects to a downstream media device in one of media data bitstreams, audio signals, audiovisual signals, media data files, media data containers, or media data structures.

10. The method as recited in claim 1, further comprising applying attenuation to one or more audio content portions in one or more audio objects in the plurality of audio objects based on one or more spatial distances between the listener and one or more sound emitters represented by the at least one audio object.

11. The method as recited in claim 1, further comprising applying Doppler-effect processing to one or more audio content portions in one or more audio objects in the plurality of audio objects based on one or more relative velocities between the listener and one or more sound emitters represented by the at least one audio object.

12. The method as recited in claim 1, wherein the plurality of audio objects comprises one or more audio objects representing audio events that produce specific sounds in response to detecting occurrences of specific audio event triggers as determined from the non-media data collected from the scene.

13. The method as recited in claim 1, wherein the plurality of audio objects comprises one or more audio objects representing pre-produced sounds and one or more other audio objects representing sounds recorded from the scene.

14. A method, comprising:
decoding a plurality of audio objects into a plurality of audio content portions and a plurality of non-audio data portions, the plurality of audio objects representing audio content for a scene, the plurality of non-audio data portions comprising one or more spatial data portions indicating one or more positions of one or more sound emitters relative to a specific perspective of a listener at a specific location at the scene, and at least one audio object in the plurality of audio objects being generated based at least in part on one or more emitter-listener relationships between the listener and one or more real-world objects or persons in a plurality of real-world objects or persons at the scene;
wherein the at least one audio object includes a specific audio object comprising a modified portion of audio data;
wherein the modified portion of audio data is modified from a specific portion of audio data based on an emitter-listener relationship between the listener and a specific real-world object or person, and wherein the emitter-listener relationship is among one or more emitter-listener relationships between the listener and the one or more real-world objects or persons in the plurality of real-world objects or persons;
wherein the one or more emitter-listener relationships between the listener and the one or more real-world objects or persons in the plurality of real-world objects or persons are determined based at least in part on non-media data relating to the plurality of real-world objects or persons in the scene;
wherein the non-media data relating to the plurality of real-world objects or persons is collected from the scene while media data is collected from the same scene, wherein the media data comprises one or more of audio data only or audiovisual data, and wherein the non-media data comprises one or more of telemetry data or non-telemetry data;
wherein the media data comprises the specific portion of audio data collected from an audio feed of an audio sensor near or at a specific real-world object or person in the plurality of real-world objects or persons;

generating channel-specific audio data based on both the plurality of audio content portions and the plurality of non-audio data portions;

wherein the method is performed by one or more computing devices.

15. The method as recited in claim 14, wherein the scene is a part of a live event; and wherein the plurality of audio objects is received from an upstream device in a live broadcast of the live event.

16. The method as recited in claim 14, wherein the plurality of audio objects further comprises one or more audio objects with one or more audio content portions generated by audio sensors at the scene.

17. The method as recited in claim 14, wherein the scene is part of a production not for live transmission, and wherein the plurality of audio objects is delivered as audio content for the scene to a post-production system.

18. The method as recited in claim 14, wherein at least one audio object in the plurality of audio objects comprises an audio content portion generated before a live event of which the scene is a part.

19. The method as recited in claim 14, wherein the listener relates to the specific location and the specific perspective at a given time, wherein at least one audio object in the plurality of audio objects comprises a specific spatial data portion that enables a downstream device to render the at least one audio object in the plurality of audio objects relative to the specific perspective from the specific location of the listener at the given time at the scene.

* * * * *